B. L. STOWE.
RUBBER LINED FABRIC HOSE.
APPLICATION FILED FEB. 18, 1911.
1,053,933.
Patented Feb. 18, 1913.
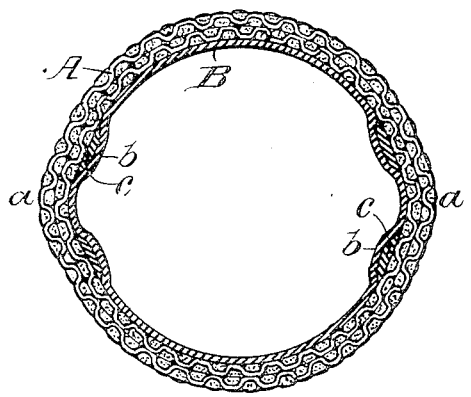
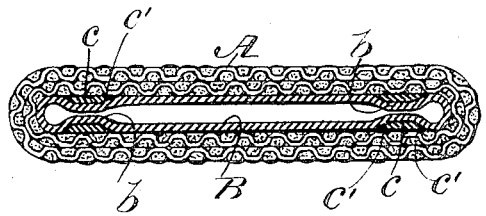
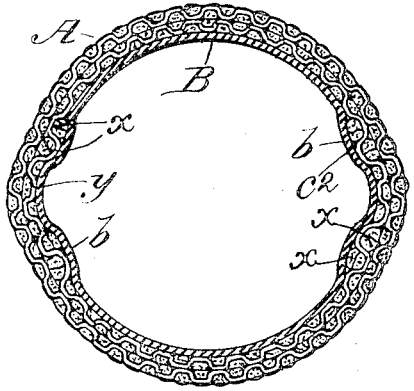
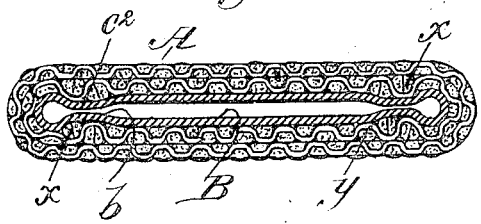
Witnesses.
Inventor:
Benjamin L. Stowe.

UNITED STATES PATENT OFFICE.

BENJAMIN L. STOWE, OF JERSEY CITY, NEW JERSEY.

RUBBER-LINED FABRIC HOSE.

1,053,933.  Specification of Letters Patent.  Patented Feb. 18, 1913.

Application filed February 18, 1911. Serial No. 609,288.

*To all whom it may concern:*

Be it known that I, BENJAMIN L. STOWE, a citizen of the United States, residing in Jersey City, county of Hudson, and State of New Jersey, have invented a new and useful Improvement in Rubber-Lined Fabric Hose, of which the following is a specification.

Rubber-lined fabric hose, when empty and not in use, is customarily flattened out, and stored in this flattened form by coiling on a reel, or otherwise, or by piling in folds on a rack. To facilitate the flattening out of the hose, it is usual to preliminarily flatten it out and pinch in its opposite longitudinal edges creases or folding seams which form the permanent lines along which the opposed faces of the hose will fold when flattened.

The object of my invention is to prevent the too sharp pinching of the rubber lining along these lines of crease, which may in time result in the weakening and rupture of the rubber lining along said lines.

To this end, my invention consists in providing the hose with internally projecting ridges extending parallel with, and in proximity to, the lines of fold or crease, so that the faces of the flattened out hose will meet first along these ridges which will constitute internally projecting separating strips by which the meeting faces of the flattened out hose in the neighborhood of the lines of fold or crease will be held far enough apart to prevent that portion of the rubber lining along the lines of fold from being sharply bent and tightly pinched.

The nature of my invention and the manner in which the same is, or may be, carried into effect will be readily understood by reference to the accompanying drawings in which—

Figure 1 is a cross section of hydraulic rubber-lined fabric hose embodying my invention,—the hose being in expanded condition. Fig. 2 is a cross section of the same in flattened out condition. Figs. 3 and 4 are like views of a modification.

A is the tubular fabric exterior and B is the tubular soft rubber lining of the hose. The rubber lining is united to the fabric jacket by and during the process of vulcanization as usual in hose of this kind, the fabric hose containing its tubular rubber lining coated with rubber cement being placed in the vulcanizer, and then steam at high pressure being introduced, which operates to effect the vulcanization, and at the same time to expand the tubular rubber lining into close contact with the walls of the fabric jacket, to which it is tightly united by the vulcanizing operation. The finished hose is creased longitudinally along diametrically opposite lines $a$ so that when flattened out its faces will naturally fold together along these lines. To prevent the faces from coming together where they are bent along these lines, with consequent undue pinching of the rubber lining at the creases, I provide along and in close proximity to the lines $a$ of fold or crease, internally projecting ridges $b$, which ridges are formed, as shown in Figs. 1 and 2, by narrow longitudinal strips $c$ of required thickness and of suitable material, (preferably soft rubber) which are cemented to the exterior of the rubber lining, adjacent to the creases and parallel therewith, the rubber lining thus being in effect thickened along the lines defined by these strips. The result is that when the rubber lining thus provided with the thickening strips $c$ is vulcanized into the tubular fabric exterior A, the expansive force of the steam within the rubber lining forces the exterior of the lining, including the strips $c$, into close union with the walls of the fabric, the pressure being such as to bring the exterior faces of the strips $c$ flush with the exterior face of the rest of the lining, the consequence being that the lining along where the strips $c$ extend, is by those strips pushed in and caused to assume the form of ridges $b$ which protrude into the interior bore of the hose, and, as seen in Fig. 2, serve to hold the faces of the lining of the flattened out hose in the immediate vicinity of the creases $a$ far enough apart to prevent the too abrupt bending of the hose along these lines, and the consequent undue pinching of the rubber lining at the creases. The thickening strips $c$ can be skived to a bevel along their longer edges, as indicated at $c'$; but this is not indispensable.

Manifestly the strips $c$ can be placed upon the interior of the rubber lining instead of upon its exterior; but the latter arrangement is preferred inasmuch as thereby the smooth unbroken interior surface of the lining is preserved.

In the modification shown in Figs. 3 and 4, the thickening ribs or strips are on the tubular woven fabric A instead of upon the rubber lining B, and in the illustration of my invention represented in these figures these ribs, shown at $c^2$, are woven integral with the fabric. They occupy the same position relatively to the creases $a$ as the rubber thickening ribs or strips $c$ in Figs. 1 and 2, and they serve the same purpose viz: to cause the rubber lining B to protrude or bulge inwardly along lines in proximity to the lines of crease to form the ridges $b$ which, when the hose is collapsed, will by their coming together against one another prevent the sharp flattening of the hose along the edges $a$. In the hose fabric A the warp is lettered $x$ and the weft $y$. The ribs $c^2$ are produced by increasing the amount of warp in the fabric at the particular points and along the particular lines at which it is decided the ribs shall appear. If the fabric is a multiply fabric, then the increased warp will preferably be in the inner ply so as to be next to the rubber lining as shown; and in any fabric, whether single ply or multiply, the warps used to produce the thickening ribs can be thrown to the inner face of the fabric more frequently than to the outer in order to produce on that face a twill in ribs or ridges, as will be understood by those skilled in the art to which my invention pertains.

In conclusion I would state that I am aware that it has heretofore been proposed, as shown for example in U. S. Patent #298,321, to reinforce the creased edges of rubber-lined woven fabric hose by rubber strips applied to the rubber lining directly upon the lines of fold or crease, and this I do not claim; but

What I claim as new and desire to secure by Letters Patent is:

1. Rubber-lined fabric hose provided along lines parallel with the creased edges of the hose, with internally protruding ridges on each side of, and in close proximity to, the lines of crease, substantially as and for the purpose hereinbefore set forth.

2. Rubber-lined fabric hose provided, along lines parallel with the creased edges of the hose, with ribs located between the tubular body of the fabric and the rubber lining, whereby the lining is caused to bulge inwardly along said lines, to form internally protruding ridges on each side of, and in close proximity to, the lines of crease, substantially as and for the purpose hereinbefore set forth.

In testimony whereof I affix my signature in presence of two witnesses.

BENJAMIN L. STOWE.

Witnesses:
EVELYN L. NORRIS,
NEWTON F. McKEON.